United States Patent
Sanz et al.

(10) Patent No.: US 9,584,489 B2
(45) Date of Patent: Feb. 28, 2017

(54) CONTROLLING ACCESS TO RESOURCE FUNCTIONS AT A CONTROL POINT OF THE RESOURCE VIA A USER DEVICE

(71) Applicant: GOOGLE INC., Mountain View, CA (US)

(72) Inventors: Roger Trias Sanz, Adliswil (CH); Erwin Aitenbichler, Zurich-Horgen (CH)

(73) Assignee: GOOGLE INC., Mountain View, CA (US)

( * ) Notice: Subject to any disclaimer, the term of this patent is extended or adjusted under 35 U.S.C. 154(b) by 82 days.

(21) Appl. No.: 14/725,818

(22) Filed: May 29, 2015

(65) Prior Publication Data

US 2016/0255055 A1  Sep. 1, 2016

Related U.S. Application Data

(63) Continuation-in-part of application No. 14/609,387, filed on Jan. 29, 2015.

(51) Int. Cl.
*H04L 29/06* (2006.01)
(52) U.S. Cl.
CPC ...... *H04L 63/0428* (2013.01); *H04L 63/0861* (2013.01)
(58) Field of Classification Search
None
See application file for complete search history.

(56) References Cited

U.S. PATENT DOCUMENTS

| 4,661,658 | A | 4/1987 | Matyas |
| 6,208,746 | B1 * | 3/2001 | Musgrave ............. G06Q 20/04 340/5.1 |

(Continued)

FOREIGN PATENT DOCUMENTS

| EP | 0 944 980 A1 | 9/1999 |
| EP | 1 693 774 A2 | 8/2006 |

OTHER PUBLICATIONS

U.S. Appl. No. 14/609,387, filed Jan. 29, 2015 to Sanz et al.
(Continued)

*Primary Examiner* — Peter Poltorak
(74) *Attorney, Agent, or Firm* — Johnson, Marcou & Isaacs, LLC

(57) ABSTRACT

Controlling access resource functions. Establishing, by a resource access manager, enrollment information (e) for each of a plurality of users. Encrypting, by the access manager, each received (e) in an authorization data item for the corresponding user. Transmitting, by the access manager, each authorization data item to a corresponding user device. Receiving, by a resource control point, from a user device, a request for access to a function of the resource, the request for access comprising the received authorization data item and verification information (v). Decrypting, by the control point, the received authorization data item to extract (e). Determining, by the control point, a similarity measure between (v) and (e). For a determined similarity measure greater than or equal to a threshold, authorizing, by the control point, the request for access. For a determined similarity measure less than the threshold, denying, by control point, the request for access.

20 Claims, 8 Drawing Sheets

(56) References Cited

U.S. PATENT DOCUMENTS

| | | | | |
|---|---|---|---|---|
| 6,219,639 | B1* | 4/2001 | Bakis | G06K 9/00885 382/116 |
| 6,317,834 | B1 | 11/2001 | Gennaro et al. | |
| 6,507,912 | B1* | 1/2003 | Matyas, Jr. | H04L 9/32 382/115 |
| 6,819,219 | B1* | 11/2004 | Bolle | G06F 21/32 340/5.52 |
| 6,934,861 | B2* | 8/2005 | Haala | G06Q 20/341 705/44 |
| 7,606,557 | B2* | 10/2009 | Park | G06Q 20/341 340/572.1 |
| 7,889,052 | B2* | 2/2011 | Berardi | G06Q 10/025 235/381 |
| 7,958,544 | B2* | 6/2011 | Chen | H04L 63/08 713/183 |
| 8,176,283 | B1* | 5/2012 | Hanson | G06F 12/14 380/264 |
| 8,200,980 | B1* | 6/2012 | Robinson | G06Q 20/04 713/186 |
| 8,276,190 | B1* | 9/2012 | Chang | H04L 63/0815 713/176 |
| 8,646,059 | B1* | 2/2014 | von Behren | G06Q 20/367 719/311 |
| 8,914,632 | B1* | 12/2014 | Shankar | H04L 63/101 713/167 |
| 9,003,516 | B2* | 4/2015 | Brown | G06Q 20/341 705/12 |
| 9,443,068 | B2* | 9/2016 | Bleahen | G06F 21/31 |
| 2002/0149467 | A1* | 10/2002 | Calvesio | G07C 9/00087 340/5.52 |
| 2002/0150283 | A1* | 10/2002 | Mimura | G06K 9/00087 382/124 |
| 2002/0162021 | A1* | 10/2002 | Audebert | G06Q 20/3672 726/4 |
| 2002/0174346 | A1* | 11/2002 | Ting | G06F 21/32 713/186 |
| 2002/0176611 | A1* | 11/2002 | Dong | G06F 21/32 382/124 |
| 2003/0014631 | A1* | 1/2003 | Sprague | H04L 63/04 713/168 |
| 2003/0046573 | A1* | 3/2003 | Bender | G07F 7/1008 726/7 |
| 2006/0080548 | A1* | 4/2006 | Okamura | G06F 21/32 713/186 |
| 2006/0136717 | A1 | 6/2006 | Buer et al. | |
| 2007/0274571 | A1* | 11/2007 | Hamza | G06K 9/0061 382/117 |
| 2009/0190802 | A1* | 7/2009 | Adams | G07C 9/00087 382/115 |
| 2014/0143543 | A1* | 5/2014 | Aikas | H04L 67/1097 713/168 |

OTHER PUBLICATIONS

Bringer, et al., "An Application of the Goldwasser-Micali Cryptosystem to Biometric Authentication", Information Security and Privacy, Jul. 2, 2007, 11 pages.

Reichert, "International Search Report and Written Opinion issued in International Application No. PCT/US2016/032803", mailed on Jul. 8, 2016, 12 pages.

* cited by examiner

CONTROLLING ACCESS TO RESOURCE FUNCTIONS AT A CONTROL POINT OF THE RESOURCE VIA A USER DEVICE

CROSS REFERENCE TO RELATED APPLICATIONS

This application is a continuation-in-part of prior application Ser. No. 14/609,387, filed Jan. 29, 2015, the complete disclosure of which is hereby fully incorporated herein by reference.

TECHNICAL FIELD

The present disclosure relates to controlling access to the functions of a computer-based resource at a control point of the resource using a user device. Certain embodiments use biometric characteristics of the user in controlling access to resource functions.

BACKGROUND

Computer-based resources (such as a retail merchant checkout system) that require a user to present identity verification information at a control point (such as point-of-sale POS) device in the retail merchant checkout system, an access control point in a building security system, or an unlock screen in a mobile phone), to verify the user's identity as part of determining whether the user is authorized to access one or more functions of the resource, are known. For example, a POS device requires a personal identification number (PIN) before determining whether a consumer corresponding to the PIN is authorized to access the payment-by-debit-card function of a retail merchant checkout system. In such applications, memory in communication with the control point at the time the function is requested maintains a database of authorized users and the required verification information corresponding to each user—for example, the passcode stored in a mobile phone (stored in the clear in the mobile phone or in a secure element of the mobile phone), or a fingerprint stored in central database of a building security system.

SUMMARY

Embodiments of the technology disclosed herein provide systems, methods, and computer program products for, controlling access to resource functions at a control point of the resource via a user device. In such methods, an access manager of a resource establishes enrollment information (e) for each of a plurality of users. The access manager encrypts each received enrollment information (e) in an authorization data item for the corresponding user. The access manager transmits each authorization data item to a user computing device of the corresponding user. A control point of the resource receives, from a user computing device having received a transmitted authorization data item, a request for access to a function of the resource. The request for access includes the received authorization data item and verification information (v). The control point decrypts the received authorization data item to extract enrollment information (e). The control point determines a similarity measure between (v) and (e). For a determined similarity measure greater than or equal to a threshold, the control point authorizes the request for access. For a determined similarity measure less than the threshold, the control point denies the request for access.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Figure 1:
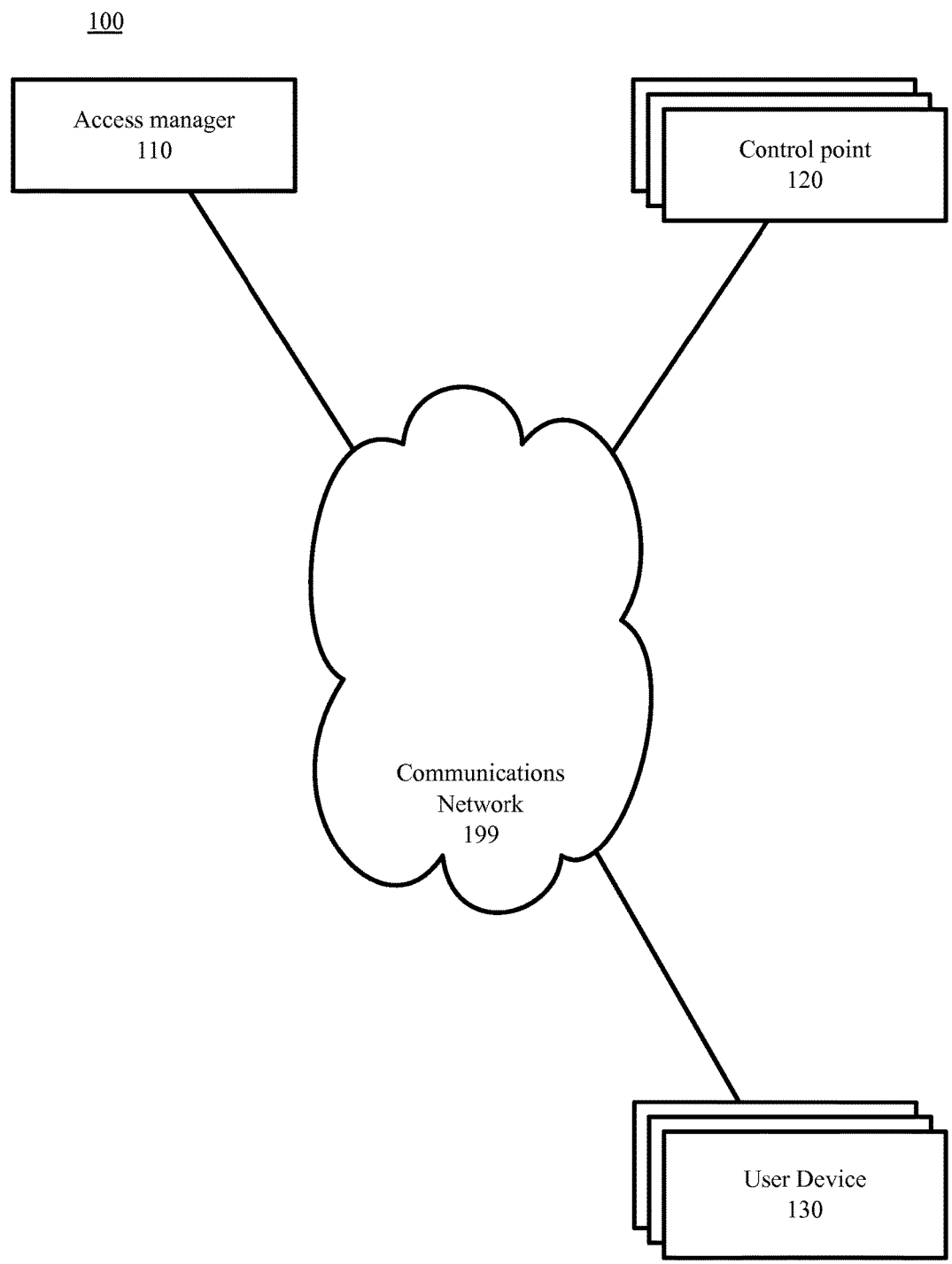
FIG. 1 is a block diagram depicting a communications and processing architecture for controlling access to resource functions at a control point via a user device, in accordance with certain example embodiments.

Turning now to the drawings, in which like numerals indicate like (but not necessarily identical) elements throughout the figures, example embodiments are described in detail.

Overview

Storing evidence of a user's identity in the clear on a user device used to access resource functions at a control point of the resource may expose the user's identity to compromise. Use of a secure element in the user device clearly requires that the user device be equipped with a secure element. Storing evidence of a user's identity, remote from the control point, in a central database requires the control point to have connectivity to the central database at the time of verification of the user's identity.

Embodiments of the present technology mitigate the risk of storing evidence of a user's identity in non-volatile memory in the clear on a user device, avoid the need for a secure element in the user device, and avoid the need for connectivity between the control point and a central database at the time of identity verification.

Consider a user establishing enrollment information (e), for example based on biometric measure such as a fingerprint, with an access manager computing system of a building security system. The access manager can encrypt the enrollment information (e) in an authorization data item. The authorization data item also can include, encrypted or otherwise, information such as the hours during which the user may access the building. The authorization data item can be transmitted to a computing device of the user, for example, to a Near Field Communication (NFC) equipped mobile phone of the user.

A control point computing system can receive a request for access to a function of the building security system from a user device, for example that the door adjacent to the control point be unlocked. The request can include both the authorization data item containing the user's encrypted fingerprint data, and verification information (v), such as a fingerprint data from a fingerprint scanned at the control point.

The control point, without requiring access to the remainder of the building security system at the time of the authorization request, can 1) decrypt the encrypted portion of the authorization data item to obtain (e). The control point can then compare (e) to (v) to confirm the user's identity (in some embodiments using a similarity measure and a threshold); and 2) determine the identified user's authorization via other information, for example the access hours, contained in the authorization message. For identified users that are determined authorized to access the function of resource, in this case to unlock the door, the control point causes the resource to perform the function.

Such an approach does not require that the user device include a secure element. It does not require that the control point have access to a database of authorized users and enrollment information (e) of each of the plurality of authorized users. It does not require that the user device store verification information (v) in the clear.

Such an approach addresses a technical challenge particular to use of a mobile device lacking a secure element in verifying a user's identity as part of determining whether the user is authorized to access some function of a computer-implemented resource. As noted above, the present technology finds use in situations where the Internet is not available at the time of verification to provide connectivity between a control point and a database of all enrolled users identification and authorization information. The technology disclosed herein can overcome the conventional sequence of events ordinarily triggered by a request for access to a function of a resource made, by a user device lacking a secure element, to a control point lacking connectivity with a database of identity verification and function authorization information at the time of identity verification. By using and relying on the technology described herein, both the resource operator (such as a merchant) and the user (such as a consumer) can benefit from an improved resource function access control that can operate without connectivity to networks such as the Internet at the time of identity verification. As such, the technology disclosed herein provides a technical solution that mitigates a technical problem presented in electronic payment systems when network connectivity, such as Internet connectivity, is not available between a control point of the resource, and identity verification data that requires protection.

Example Architectures

FIG. 1 is a block diagram depicting a communications and processing architecture 100 for controlling access to resource functions at a control point via a user device, in accordance with certain example embodiments. While some servers, systems, and devices shown in the architecture are represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the architecture 100 includes network devices 110, 120, and 130; each of which may be configured to communicate with one another via communications network 199. In some embodiments, a user associated with a device must install an application and/or make a feature selection to obtain the benefits of the technology described herein.

Network 199 includes one or more wired or wireless telecommunications means by which network devices may exchange data. For example, the network 199 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device 110, 120, and 130 can include a communication module capable of transmitting and receiving data over the network 199. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device. In the example embodiment depicted in FIG. 1, a resource operator such as a building security manager may operate access manager 110 and control point 120; a user may operate user device 130.

Figure 8:
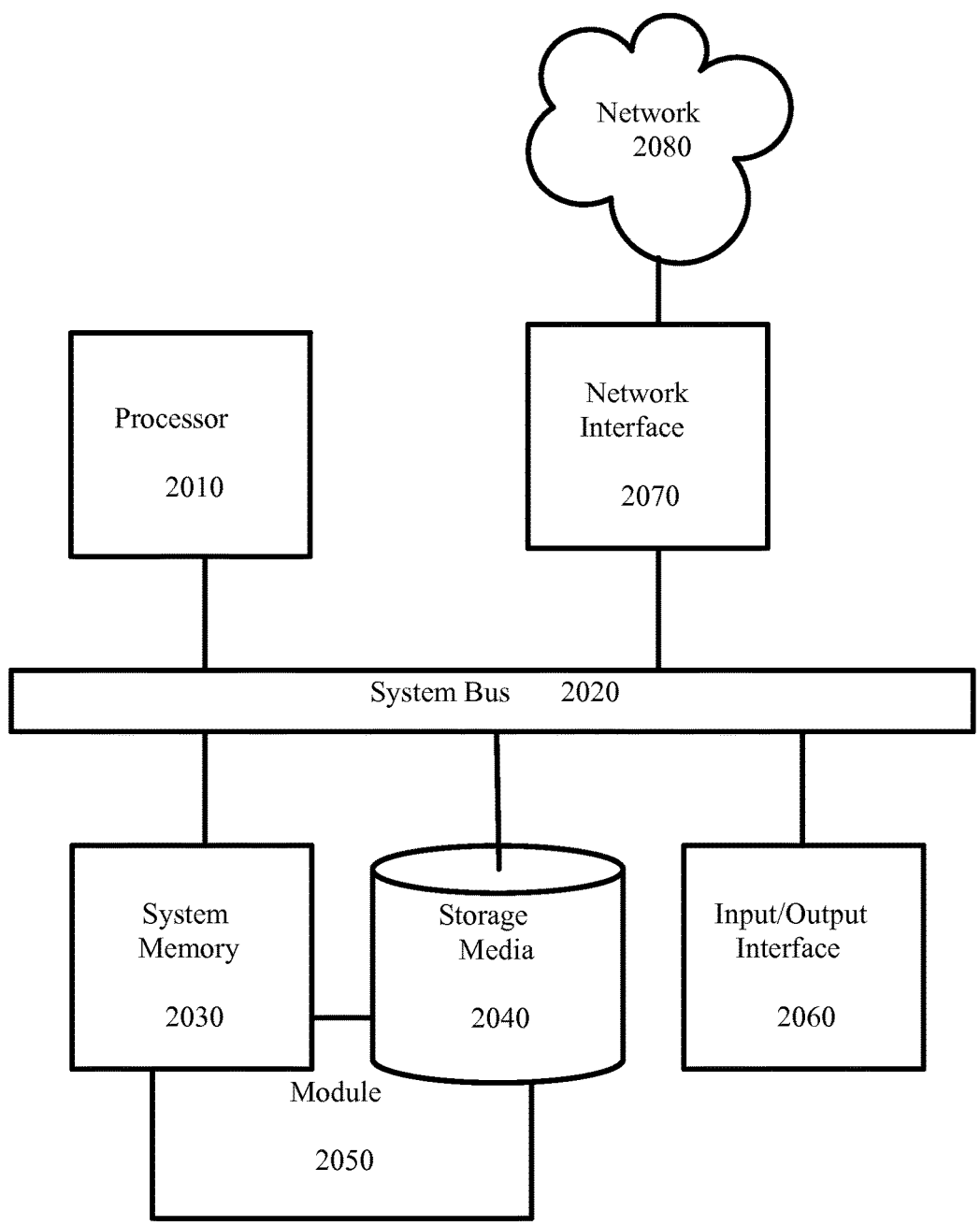
FIG. 8 is a diagram depicting a computing machine and a module, in accordance with certain example embodiments of the disclosed technology.

In example embodiments, the network devices, and any other computing machines associated with the technology presented herein, may be any type of computing machine such as, but not limited to, those discussed in more detail with respect to FIG. 8. Furthermore, any modules associated with any of these computing machines, such as modules described herein or any other modules (scripts, web content, software, firmware, or hardware) associated with the technology presented herein may by any of the modules discussed in more detail with respect to FIG. 8. The computing machines discussed herein may communicate with one another as well as other computer machines or communication systems over one or more networks, such as communications network 199. The communications network 199 may include any type of data or communications network, including any of the network technology discussed with respect to FIG. 8.

The network connections illustrated are example and other means of establishing a communications link between the computers and devices can be used. Moreover, those having ordinary skill in the art having the benefit of the present disclosure will appreciate that the network devices illustrated in FIG. 1 may have any of several other suitable computer system configurations. For example, user device 130 may be embodied as a mobile phone or handheld computer and may not include all the components described above.

Example Processes

The example methods illustrated in figures are described hereinafter with respect to the components of the example communications and processing architecture 100. The example methods can also be performed with other systems and in other environments. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
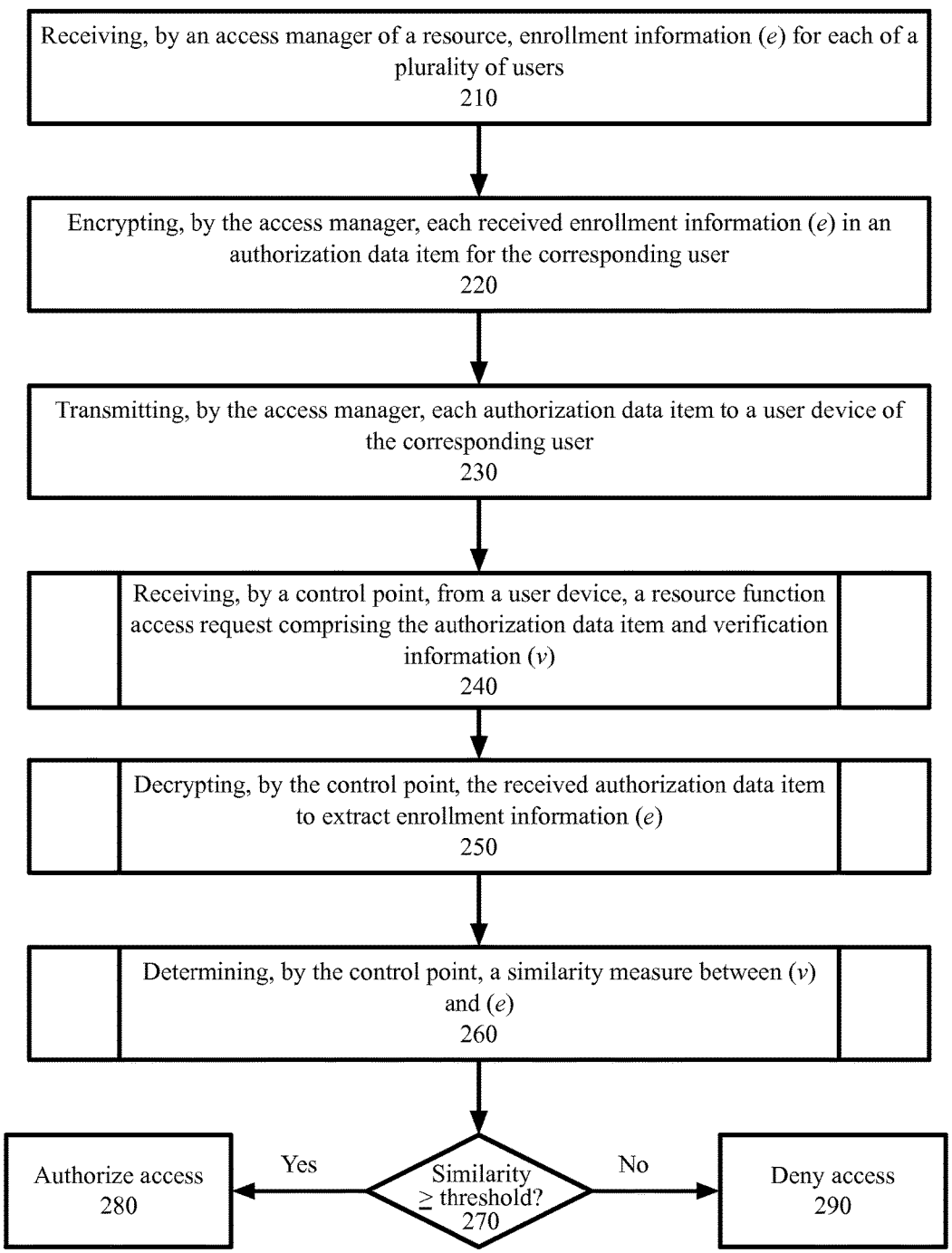
FIG. 2 is a block diagram depicting control of access to resource functions at a control point via a user device, in accordance with certain example embodiments.

Referring to FIG. 2, a block flow diagram depicting methods 200 for controlling access to resource functions at a control point via a mobile user device, in accordance with certain example embodiments, is shown. In such methods, an access manager of a resource receives enrollment information (e) for each of a plurality of users—Block 210. Consider, as part of a continuing example, a computer-based building security system as the resource, and fingerprint information the enrollment information (e).

The building security system can include an access manager, such as access manager 110, and a plurality of NFC-enabled control points, such as control point 120. Each control point 120 can be located at an entrance to the building, and can be connected to the access manager by a communications network such as communications network 199.

The friction ridges on our fingers help the hand to grasp objects, and since their pattern is substantially unique and immutable, it can also serve for person identification. The points where such ridges end abruptly or branch are called minutia points. A fingerprint can be verified by comparing the positions and orientations of these minutia points. In embodiments using fingerprint information as enrollment information (e), the access manager 110 can compute an orientation field and a binary image from a gray scale input image of a fingerprint from a fingerprint sensor. The fingerprint sensor can be part of the access manager 110 or can be separate from the access manager 110. In some embodiments, the enrollment information (e) is collected via a trusted device, which can be separate from the resource. In some embodiments, the user device 130 itself can be used to collect enrollment information (e).

For each abruptly ending or branching line of the fingerprint image, the access manager 110 creates a minutiae point. The access manager 110 associates each minutiae point with an orientation vector. The set of minutiae points and their orientation vectors constitute the fingerprint information.

The process of receiving enrollment information can be rerun to revise, update, or change the enrollment data (e). A change to enrollment data (e) can include a change in type of enrollment data (e), for example from fingerprint information to a PIN, or vice versa.

The access manager 110 can encrypt each received enrollment information (e) in an authorization data item for the corresponding user—Block 220. The access manager 110 encrypts the enrollment information (e) so that only control points will be able to decrypt the enrollment information (e). For example, such encryption can be performed with symmetric cryptography where a secret key is shared between the access manager 110 and the control points 120 (but not the user devices 130) or with asymmetric cryptography where only the control points 120 have the appropriate private key corresponding to a public key used to encrypt the enrollment information (e). The authorization data item also can contain 1) a message authentication code, 2) additional information that can be used in determining the authorization of a properly identified user. As an example of such additional information in the continuing example, consider hours during which a verified individual is authorized to enter the building.

The access manager 110 transmits each authorization data item to a user computing device 130 of the corresponding user—Block 230. In the continuing example, the access manager 110 transmits each authorization data item over communications network 199 to an NFC-capable mobile phone 130 of each user authorized to enter the building. In some embodiments, the authorization data item can be embedded in hardware of the user device 130. In each case, the user device, lacking a proper key, cannot readily decrypt the enrollment information (e) that has been encrypted in the authorization message.

A control point 120 receives a request for access to a function of the resource from a user device 130—specifically from a user device 130 having received a transmitted authorization data item from the access manager 110—Block 240. The request for access includes both the received authorization data item and verification information (v). In the continuing example, the user device 130 acquires a fingerprint image from the user and derives fingerprint information therefrom before transmitting the fingerprint information as verification information (v) to the control point 120 via a secure NFC channel opened between the control point 120 and the user device 130. In some embodiments, each, some, or all of acquiring raw data such as a fingerprint image, converting the raw data to verification information (v), and any other processing required continue to process can occur at either the user device 130 or the control point 120.

The control point 120 can decrypt the received authorization data item to extract enrollment information (e)—Block 250. The control point 120 can determine a similarity measure between the verification information (v) and enrollment information (e)—Block 260. In the continuing example, the control point 120 compares the fingerprint information gathered during enrollment with the fingerprint information gathered in conjunction with the request for access.

The control point 120 does not have to determine exact identity between the enrollment information (e) and the verification information (v). The control point 120 can use a similarity threshold—Block 270.

In general, to determine a similarity measure between enrollment information (e) and verification information (v), the control point 120 evaluates a function f (e, v). The function f (e, v) is specific to the particular type of (e) and (v) that is being used. For the fingerprint information being used in the continuing example, each minutiae point is paired with its most similar counterpart. The control point 120 performs an alignment to compensate for panning and scaling effects. The control point 120 computes a similarity score to reflect the degree of match between two fingerprints based on factors such as the number of matching minutiae, the percentage of matching minutiae in the overlapping area of two fingerprints, and the consistency of ridge count between matching minutiae.

For a determined similarity measure greater than or equal to a threshold ("Yes" path from Block 270), the control point can authorize the request for access—Block 280. For a determined similarity measure less than the threshold ("No" path from Block 270), the control point can deny the request for access—Block 290.

In some embodiments, the control point 120 comprises a secure element. The secure element can store the decryption key, perform the decryption, and compare verification information (v) to enrollment information (e). In such embodiments, the decryption key cannot be obtained by an attacker, the decrypted enrollment information (e) cannot be obtained by an attacker, the authorization requests can be throttled to mitigate the risk of brute-force attacks.

Figure 3:
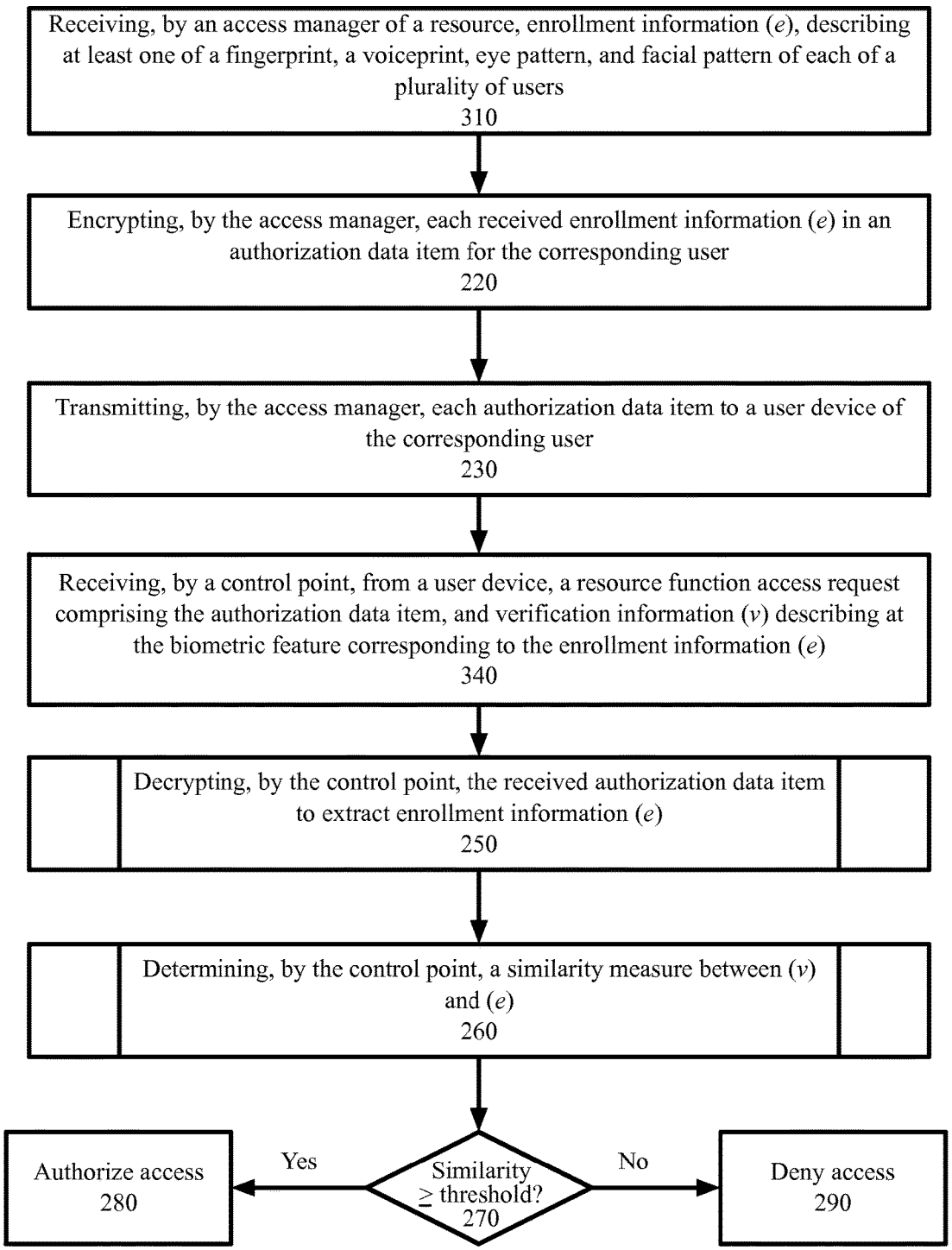
FIG. 3 is a block diagram depicting control of access to resource functions at a control point via a user device, in accordance with certain example embodiments.

Referring to FIG. 3, and continuing to refer to prior figures for context, a block diagram 300 depicting methods for control of access to resource functions at a control point via a mobile user device, in accordance with certain example embodiments is shown. In such embodiments, Block 220, Block 230, Block 250, Block 260—Block 290 are performed as described in connection with FIG. 2. In such embodiments, the enrollment information (e) comprises information describing a user biometric characteristic (Block 310) and the verification information (v) comprises the same type of user biometric characteristic (Block 340). In particular, the biometric characteristic comprises one of: a fingerprint (as in the embodiment described in conjunction with FIG. 2), a voiceprint, an eye pattern, a facial pattern, a handwritten signature, and a typing pattern.

With regard to a voiceprint, while the goal of speech recognition is to understand what is being said and ignore voice features such as accent, pitch, intonation, speed, etc., voice (or speaker) recognition aims to compare these voice features, while ignoring what is said. In a typical voice recognition application a voice sample is obtained, but it is not stored as is, rather some components, typically called "features", of a spectral analysis of the sample are stored. The voice biometric sample is sent raw to the control point 120, who then derives the biometric verification data (v), or the user device 130 derives the biometric enrollment data (e) and sends it to the control point 120.

In eye pattern recognition, either a retina pattern or an iris pattern can be used. The human retina is formed by a complex structure of capillaries that supplies the retina with blood, exposing a unique pattern. The iris also exposes complex random patterns that are unique and stable. In addition, the iris typically is easier to scan than the retina. Face recognition compares distinctive features, such as the outlines of the mouth, the areas around the cheekbones, the eye sockets, and the locations of nose and eyes.

An individual's signature is considered to be hard to forge. Signature verification can be made even stronger by also taking the dynamics into account. This can be done by comparing features such as pen pressure and writing speed at various points in the signature at the control point 120. Similar to comparing handwriting dynamics, typing pattern recognition compares the dynamics of a user typing on a keyboard, such as intervals between keystrokes, and overall speed and patterns.

Figure 4:
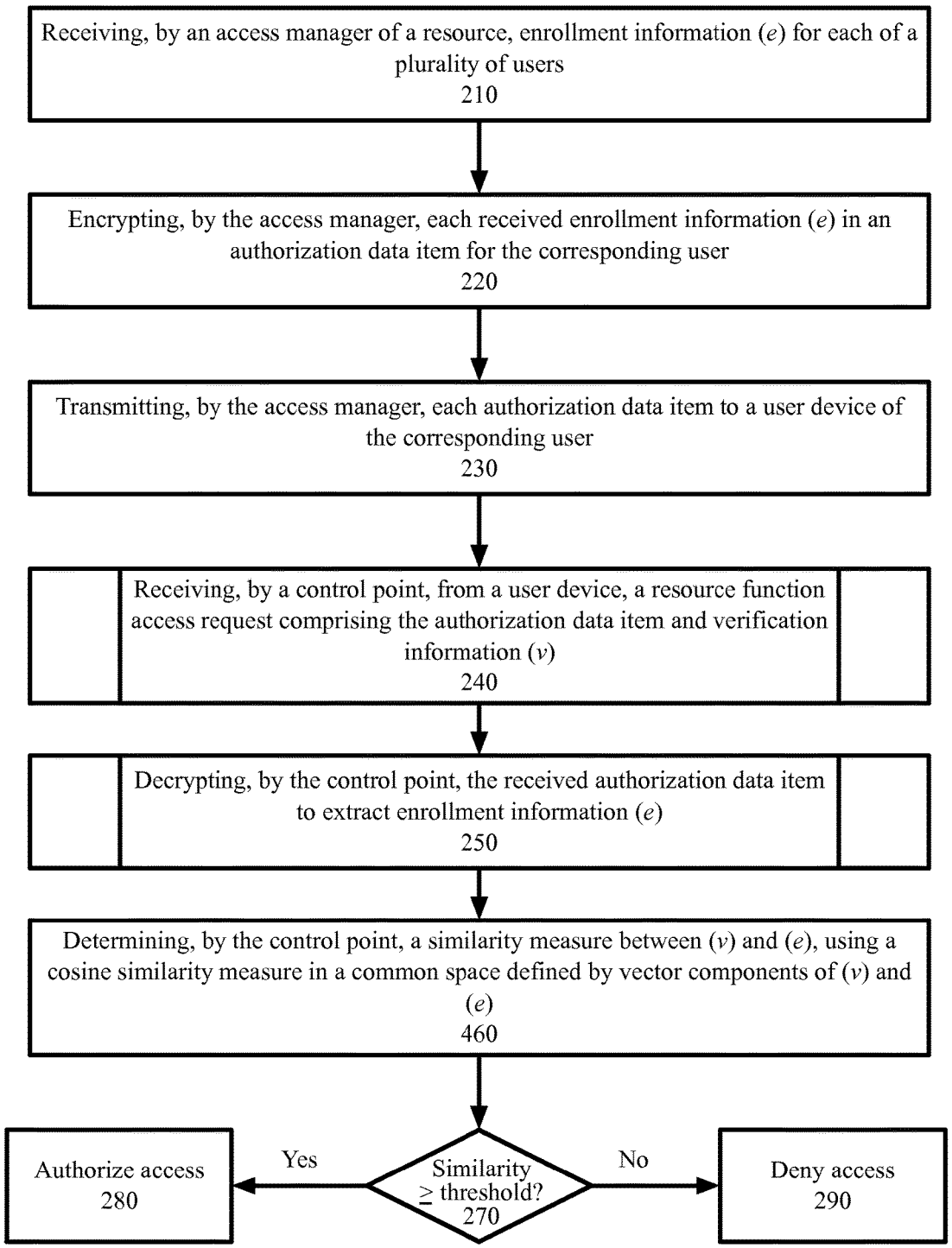
FIG. 4 is a block diagram depicting control of access to resource functions at a control point via a user device, in accordance with certain example embodiments.

Referring to FIG. 4, and continuing to refer to prior figures for context, a block diagram 400 depicting methods for control of access to resource functions at a control point 120 via a mobile user device 130, in accordance with certain example embodiments is shown. In such embodiments, Block 210—Block 250 and Block 270—Block 290 are performed as described in connection with FIG. 2. In such embodiments, the similarity measure between the enrollment information (e) and the verification information (v) comprises a cosine similarity measure in a common space defined by vector components of (v) and (e)—Block 460. In the continuing example, the orientation vectors of each minutia point across (v) and (e) are compared for similarity using a cosine measure.

Figure 5:
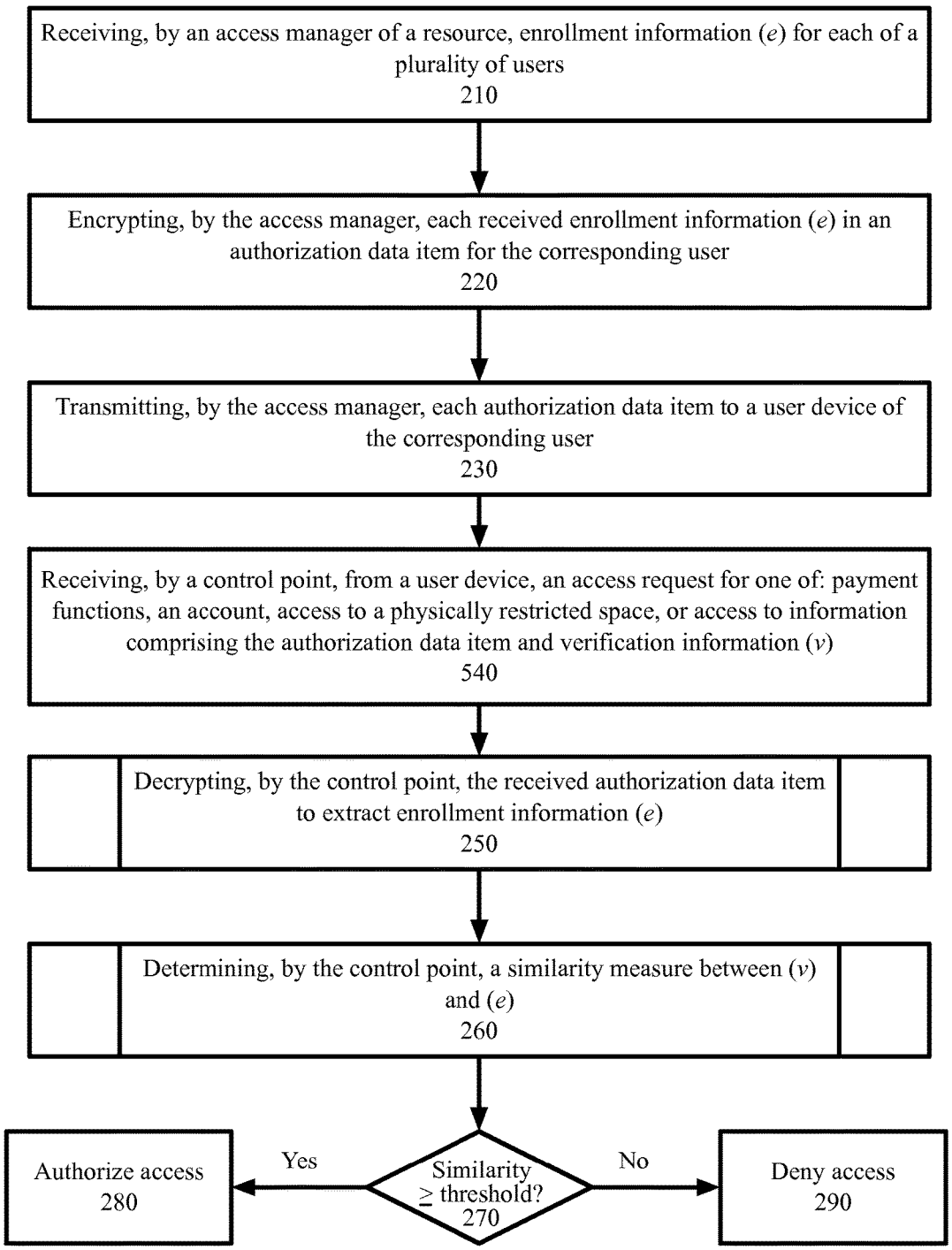
FIG. 5 is a block diagram depicting control of access to resource functions at a control point via a user device, in accordance with certain example embodiments.

Referring to FIG. 5, and continuing to refer to prior figures for context, a block diagram 500 depicting control of access to resource functions at a control point via a mobile user device, in accordance with certain example embodiments is shown. In such embodiments, Block 210—Block 230 and Block 250—Block 290 are performed as described in connection with FIG. 2. In such embodiments, access to the function of the resource comprises at least one of: access to electronic payment functions, access to an account, access to a physically restricted space (as in the continuing example), and access to information—Block 540.

Figure 6:
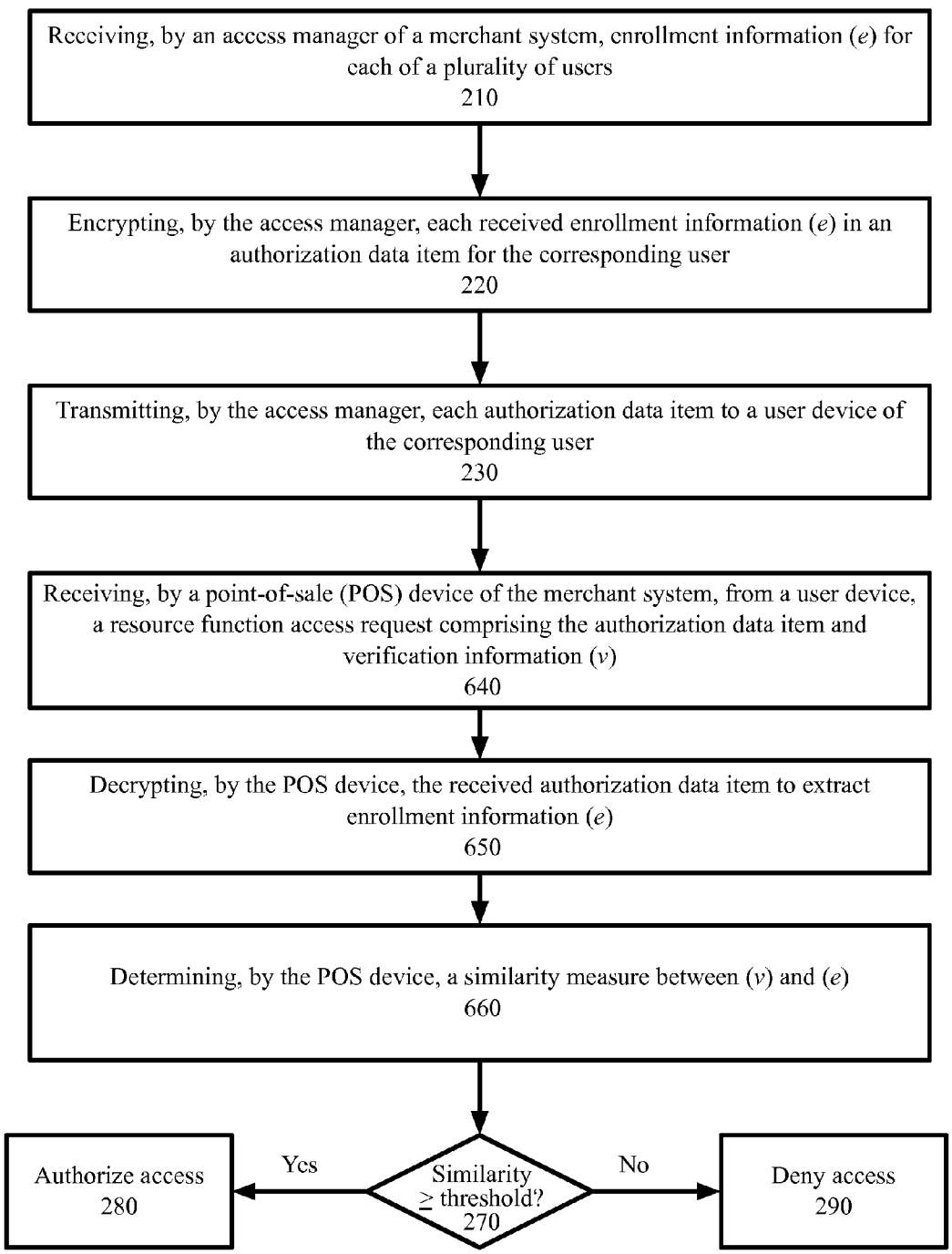
FIG. 6 is a block diagram depicting control of access to resource functions at a control point via a user device, in accordance with certain example embodiments.

Referring to FIG. 6, and continuing to refer to prior figures for context, a block diagram 600 depicting control of access to resource functions at a control point via a mobile user device, in accordance with certain example embodiments is shown. In such embodiments, Block 210—Block 230, Block 280, and Block 290 are performed as described in connection with FIG. 2. In such embodiments the resource is a merchant system at a merchant location, and the control point is a point-of-sale (POS) system. In some such embodiments, the user, after establishing enrollment information (e), such as a voiceprint, with the access manager 110, receives an authorization data item on the user's NFC-enabled mobile device 130. When the user wishes to initiate a purchase at the merchant location, the user taps the NFC-enabled mobile device 130 at a POS control point 120 of the merchant location and speaks into the user device. A secure communications channel 199 is established between the mobile device 130 and the POS device 120, over which the authorization data item containing the encrypted enrollment information (e) and the voice print as verification information (v) to be received by the POS device 120—Block 640. The POS device 120 can decrypt the received authorization data item to extract the enrollment information (e)—Block 650. The POS device 120 can then determine a similarity measure, such as the cosine similarity measure discussed elsewhere herein, between the enrollment information (e) and the verification information (v)—Block 660. As in the method 200 described in connection with FIG. 2, for a determined similarity measure greater than or equal to a threshold ("Yes" path from Block 270), the control point can authorize the request for access—Block 280. For a determined similarity measure less than the threshold ("No" path from Block 270), the control point can deny the request for access—Block 290.

Figure 7:
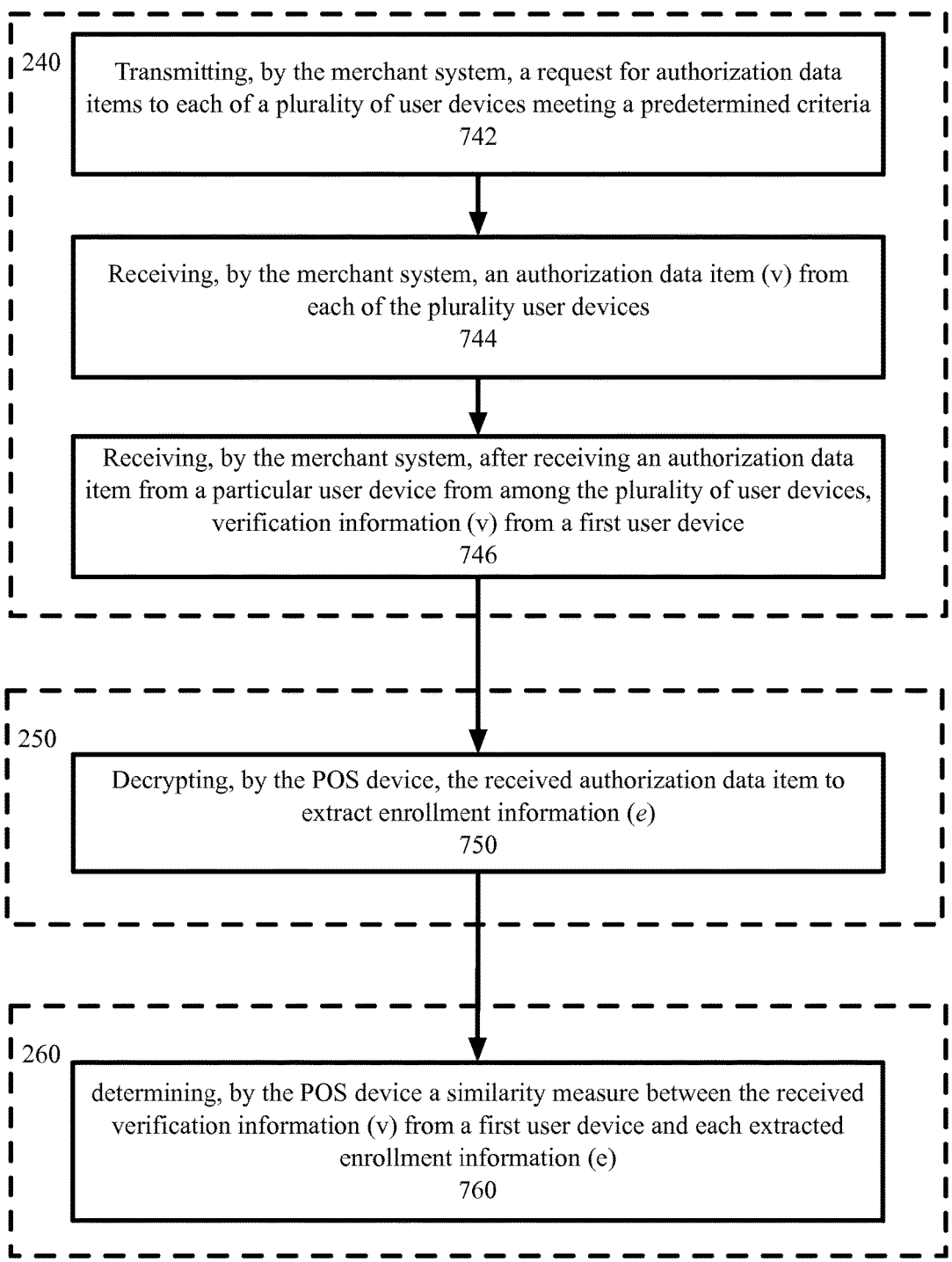
FIG. 7 is a block diagram depicting control of access to resource functions at a control point via a user device, in accordance with certain example embodiments.

Referring to FIG. 7, and continuing to refer to prior figures for context, a block diagram 700 depicting control of access to resource functions at a control point via a mobile user device, in accordance with certain example embodiments is shown. In such embodiments, Block 210—Block 230 and Block 270—Block 290 are performed as described in connection with FIG. 2. In such embodiments, receiving a request for access (Block 240) includes transmitting, by a merchant system, a request for authorization data items to each of a plurality of user devices meeting a predetermined criteria—Block 742. For example, a control point 120 can transmit a request that each user device 130 that enters the merchant's store provide the authorization data item corresponding to the user device 130. The request can be transmitted regularly, irregularly, or triggered by external events (for example, when a user device enters the merchant location, when a user device is used to scan an item at the merchant's location for information). In any of these cases, transmitting the request for authorization can be de-coupled from the user initiating a purchase and from the requirement for verification information (v). In this fashion, user devices 130 in the store (a proximity measure) can be polled for authorization data items.

In some embodiments, a request from the merchant system for the authorization data item of certain user devices 130 is not required. In such embodiments, a user device 130 can transmit its authorization data item to a merchant system without prompting at regular intervals, randomly, or in some other fashion.

In response to the request for authorization items, the merchant system (via the POS device 120 or other device that is part of the merchant system an in communication with the POS device 120) can receive an authorization data item (v) from each of the plurality user devices—Block 744.

The merchant system (via the POS device 120 or other device that is part of the merchant system an in communication with the POS device 120), can receive verification information (v) from a first user device 130 (Block 746), and then decrypt each received authorization data item to extract the enrollment information (e)—Block 750. Note that each authorization data item is decrypted to extract the enrollment information (e) corresponding to each user device 130, but only the verification information (v) for a user device 130 of the user wishing to initiate a transaction is received.

The merchant system (via the POS device 120 or other device that is part of the merchant system an in communication with the POS device 120), can determine a similarity measure between the received verification information (v) from a first user device and each extracted enrollment information (e)—Block 760. If the verification information (v) is similar at or greater than a predetermined threshold to only one extracted enrollment information (e), then access is authorized. Reducing the possible universe of enrollment information (e) to only those in proximity to the merchant location allows the use of a lower threshold similarity than would otherwise be effective if the verification information (v) needed to be distinguished form the entire population of enrollment information (e).

While location/proximity is used in the examples related to FIG. 7 to define set of user devices from which an authorization data item is requested, other criteria, alone or in combination, can be used. For example, the technology can poll all user devices that have visited the resource location within a given time period, regardless of whether the devices are presently at that location. As another example, the technology can poll only the subset of user devices at a location that have previously consented to being polled.

Other Example Embodiments

FIG. 8 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid sate drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device, for example, a system on chip (SOC), system on package (SOP), or ASIC device.

In situations in which the technology discussed here collects personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (for example, to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the technology described herein. For example, in embodiments described by FIG. 7, decryption, by the POS device 120, of received authorization information can occur before receiving verification information (v) from a user device 130.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to control access to functions of a resource, comprising:
    establishing, by an access manager of a resource, enrollment information (e) for each of a plurality of users;
    encrypting, by the access manager, each received enrollment information (e) in an authorization data item for the corresponding user;
    transmitting, by the access manager, each authorization data item to a user computing device of the corresponding user;
    receiving, by a control point of the resource, from a user computing device having received a transmitted authorization data item, a request for access to a function of the resource, the request for access comprising the received authorization data item and verification information (v);
    decrypting, by the control point, the received authorization data item to extract enrollment information (e);
    determining, by the control point, a similarity measure between (v) and (e);
    for a determined similarity measure greater than or equal to a threshold, authorizing, by the control point, the request for access; and
    for a determined similarity measure less than the threshold, denying, by control point, the request for access.

2. The method of claim 1, wherein the enrollment information (e) and the verification information (v) comprise information describing a user biometric characteristic.

3. The method of claim 2, wherein the biometric characteristic comprises one of:
    a fingerprint, a voiceprint, eye pattern, and facial pattern.

4. The method of claim 1, wherein access to the function of the resource comprises at least one of: access to electronic payment functions, access to an account, access to a physically restricted space, and access to information.

5. The method of claim 1, wherein the similarity measure comprises a cosine similarity measure in a common space defined by vector components of (v) and (e).

6. The method of claim 1, wherein the resource comprises a merchant system at a merchant location, and the control point is a point-of-sale (POS) device of the merchant system.

7. The method of claim 6, wherein:
    receiving a request for access comprises:
        transmitting, by the merchant system, a request for authorization data items to each of a plurality of user devices meeting a predetermined criteria;
        receiving, by the merchant system, an authorization data item (v) from each of the plurality user devices;
        receiving, by the merchant system, after receiving an authorization data item from a particular user device from among the plurality of user devices, verification information (v) from a first user device;
    decrypting comprises decrypting, by the POS device, each received authorization data item to extract the enrollment information (e); and
    determining a similarity measure between (v) and (e) comprises determining, by the POS device a similarity measure between the received verification information (v) from a first user device and each extracted enrollment information (e).

8. A computer program product, comprising:
    a non-transitory computer-readable storage device having computer-executable program instructions embodied thereon that when executed by a computer cause the computer to control access to functions of a resource, the computer-executable program instructions comprising:
        computer-executable program instructions to establish, by an access manager of the resource, enrollment information (e) for each of a plurality of users;
        computer-executable program instructions to encrypt, by the access manager, each received enrollment information (e) in an authorization data item for the corresponding user;
        computer-executable program instructions to transmit, by the access manager, each authorization data item to a user computing device of the corresponding user;
        computer-executable program instructions to receive, by a control point of the resource, from a user computing device having received a transmitted authorization data item, a request for access to a function of the resource, the request for access comprising the received authorization data item and verification information (v);
        computer-executable program instructions to decrypt, by the control point, the received authorization data item to extract enrollment information (e);
        computer-executable program instructions to determine, by the control point, a similarity measure between (v) and (e);

computer-executable program instructions, for a determined similarity measure greater than or equal to a threshold, to authorize, by the control point, the request for access; and computer-executable program instructions, for a determined similarity measure less than the threshold, to deny, by control point, the request for access.

9. The computer program product of claim 8, wherein the enrollment information (e) and the verification information (v) comprise information describing a user biometric characteristic.

10. The computer program product of claim 9, wherein the biometric characteristic comprises one of: a fingerprint, a voiceprint, eye pattern, and facial pattern.

11. The computer program product of claim 8, wherein access to the function of the resource comprises at least one of: access to electronic payment functions, access to an account, access to a physically restricted space, and access to information.

12. The computer program product of claim 8, wherein the similarity measure comprises a cosine similarity measure in a common space defined by vector components of (v) and (e).

13. The computer program product of claim 8, wherein the resource comprises a merchant system at a merchant location, and the control point is a point-of-sale (POS) device of the merchant system.

14. The computer program product of claim 13, wherein:
computer-executable program instructions to receive a request for access comprise:
computer-executable program instructions to transmit, by the merchant system, a request for authorization data items to each of a plurality of user devices meeting a predetermined criteria;
computer-executable program instructions to receive, by the merchant system, an authorization data item (v) from each of the plurality user devices;
computer-executable program instructions to receive, by the merchant system, after receiving an authorization data item from a particular user device from among the plurality of user devices, verification information (v) from a first user device;
computer-executable program instructions to decrypt comprise computer-executable program instructions to decrypt, by the POS device, each received authorization data item to extract the enrollment information (e); and
computer-executable program instructions to determine a similarity measure between (v) and (e) comprise computer-executable program instructions to determine, by the POS device, a similarity measure between the received verification information (v) from a first user device and each extracted enrollment information (e).

15. A system to control access to functions of a resource, the system comprising:
a storage device; and
a processor communicatively coupled to the storage device, wherein the processor executes application code instructions that are stored in the storage device to cause the system to:
establish, by an access manager of the resource, enrollment information (e) for each of a plurality of users;
encrypt, by the access manager, each received enrollment information (e) in an authorization data item for the corresponding user;
transmit, by the access manager, each authorization data item to a user computing device of the corresponding user;
receive, by a control point of the resource, from a user computing device having received a transmitted authorization data item, a request for access to a function of the resource, the request for access comprising the received authorization data item and verification information (v);
decrypt, by the control point, the received authorization data item to extract enrollment information (e);
determine, by the control point, a similarity measure between (v) and (e);
for a determined similarity measure greater than or equal to a threshold, authorize, by the control point, the request for access; and
for a determined similarity measure less than the threshold, deny, by control point, the request for access.

16. The system of claim 15, wherein the enrollment information (e) and the verification information (v) comprise information describing a user biometric characteristic.

17. The system of claim 16, wherein the biometric characteristic comprises one of: a fingerprint, a voiceprint, eye pattern, and facial pattern.

18. The system of claim 15, wherein the similarity measure comprises a cosine similarity measure in a common space defined by vector components of (v) and (e).

19. The system of claim 15, wherein the resource comprises a merchant system at a merchant location, and the control point is a point-of-sale (POS) device of the merchant system.

20. The system of claim 19, wherein:
application code instructions to cause the system to receive a request for access comprise:
application code instructions to cause the system to transmit, by the merchant system, a request for authorization data items to each of a plurality of user devices meeting a predetermined criteria;
application code instructions to cause the system to receive, by the merchant system, an authorization data item (v) from each of the plurality user devices;
application code instructions to cause the system to receive, by the merchant system, after receiving an authorization data item from a particular user device from among the plurality of user devices, verification information (v) from a first user device;
application code instructions to cause the system to decrypt comprise application code instructions to cause the system to decrypt, by the POS device, each received authorization data item to extract the enrollment information (e); and
application code instructions to cause the system to determine a similarity measure between (v) and (e) comprises application code instructions to cause the system to determine, by the POS device, a similarity measure between the received verification information (v) from a first user device and each extracted enrollment information (e).

* * * * *